US011781632B2

(12) United States Patent
Kataoka

(10) Patent No.: US 11,781,632 B2
(45) Date of Patent: Oct. 10, 2023

(54) GEAR DEVICE AND ROBOT

(71) Applicant: SEIKO EPSON CORPORATION, Tokyo (JP)

(72) Inventor: Yuya Kataoka, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 21 days.

(21) Appl. No.: 17/400,120

(22) Filed: Aug. 12, 2021

(65) Prior Publication Data
US 2022/0049762 A1 Feb. 17, 2022

(30) Foreign Application Priority Data
Aug. 14, 2020 (JP) .................................. 2020-136976

(51) Int. Cl.
*F16H 49/00* (2006.01)
*B25J 9/10* (2006.01)

(52) U.S. Cl.
CPC .......... *F16H 49/001* (2013.01); *B25J 9/1025* (2013.01); *F16H 2049/003* (2013.01)

(58) Field of Classification Search
CPC ............. F16H 49/001; F16H 2049/003; F16H 57/029; B25J 9/1025
See application file for complete search history.

(56) References Cited

U.S. PATENT DOCUMENTS

| 3,523,488 A * | 8/1970 | Robinson ............... F16H 49/001 74/640 |
| 2009/0233750 A1* | 9/2009 | Nakamura ............ F16H 37/065 475/162 |
| 2015/0300475 A1* | 10/2015 | Murayama ............ F16H 49/001 74/640 |
| 2017/0370457 A1* | 12/2017 | Kobayashi ................ F16H 1/32 |
| 2020/0003288 A1 | 1/2020 | Mendel et al. |
| 2020/0072338 A1 | 3/2020 | Tezuka et al. |

FOREIGN PATENT DOCUMENTS

| JP | 2007016838 A | 1/2007 |
| JP | 2020509311 A | 3/2020 |
| WO | 2018189798 A1 | 10/2018 |

* cited by examiner

*Primary Examiner* — Jake Cook
(74) *Attorney, Agent, or Firm* — Gang Yu

(57) ABSTRACT

A gear device includes an internal gear, an external gear having flexibility, a wave generator, a cross roller bearing, and a first seal and a second seal. The external gear includes a cylindrical body section including a first end portion, with which the wave generator is in contact, and a second end portion on the opposite side of the first end portion, external teeth provided on the outer circumferential surface of the first end portion, an annular diaphragm section provided on the outer side of the second end portion, and a boss section provided on the outer side of the diaphragm section. The first seal is sandwiched between the boss section and an outer ring of the cross roller bearing. The second seal includes a proximal end fixed to the outer ring and a distal end in contact with the outer circumferential surface of an inner ring.

6 Claims, 7 Drawing Sheets

GEAR DEVICE AND ROBOT

The present application is based on, and claims priority from JP Application Serial Number 2020-136976, filed Aug. 14, 2020, the disclosure of which is hereby incorporated by reference herein in its entirety.

BACKGROUND

1. Technical Field

The present disclosure relates to a gear device and a robot.

2. Related Art

In a robot including a robot arm, for example, a joint section of the robot arm is driven by a motor. In general, rotation of the motor is decelerated via a speed reducer and transmitted to an arm. As such a speed reducer, for example, a wave gear device described in JP-A-2007-16838 (Patent Literature 1) has been known.

The wave gear device described in Patent Literature 1 includes an annular internal gear on which internal teeth are formed, a flexible external gear on which external teeth meshing with the internal teeth are formed, and a wave generator disposed on the inner side of the external gear. A cross roller bearing attached with a one-side seal or both-side seals is disposed in an outer side position in the radial direction of the internal gear. By providing such a seal member, it is unnecessary to provide oil seals in other members.

Sealability of the cross roller bearing attached with the seal described in Patent Literature 1 is sometimes set low not to prevent rotation of the cross roller bearing. Accordingly, grease easily moves between a gap between the external gear and the cross roller bearing and the inside of the cross roller bearing. Then, the grease tends to move to only a part in a range to which the grease should be spread which makes the life of the wave gear device shorten. Accordingly, it is demanded to reduce a movement amount of the grease by improving sealability around the cross roller bearing.

SUMMARY

A gear device according to an application example of the present disclosure includes: an internal gear; an external gear having flexibility and configured to partially mesh with the internal gear and rotate around a rotation axis relatively to the internal gear; a wave generator configured to come into contact with an inner circumferential surface of the external gear and move a meshing position of the internal gear and the external gear in a circumferential direction around the rotation axis; a cross roller bearing including an outer ring and an inner ring; and a first seal and a second seal fixed to the outer ring. The external gear includes: a cylindrical body section including a first end portion, with which the wave generator is in contact, and a second end portion on an opposite side of the first end portion; external teeth provided on an outer circumferential surface of the first end portion; an annular diaphragm section provided on an outer side of the second end portion; and a boss section provided on an outer side of the diaphragm section. The first seal is sandwiched between the boss section and the outer ring. The second seal includes a proximal end and a distal end. The proximal end is fixed to the outer ring. The distal end is in contact with an outer circumferential surface of the inner ring.

A robot according to an application example of the present disclosure includes: a first member; a second member configured to turn with respect to the first member; the gear device described above configured to transmit a driving force for turning the second member relatively to the first member; and a driving source configured to output the driving force toward the gear device.

DESCRIPTION OF EXEMPLARY EMBODIMENTS

A gear device and a robot of the present disclosure are explained in detail below based on preferred embodiments shown in the accompanying drawings.

1. Robot

First, a robot is briefly explained.

Figure 1:
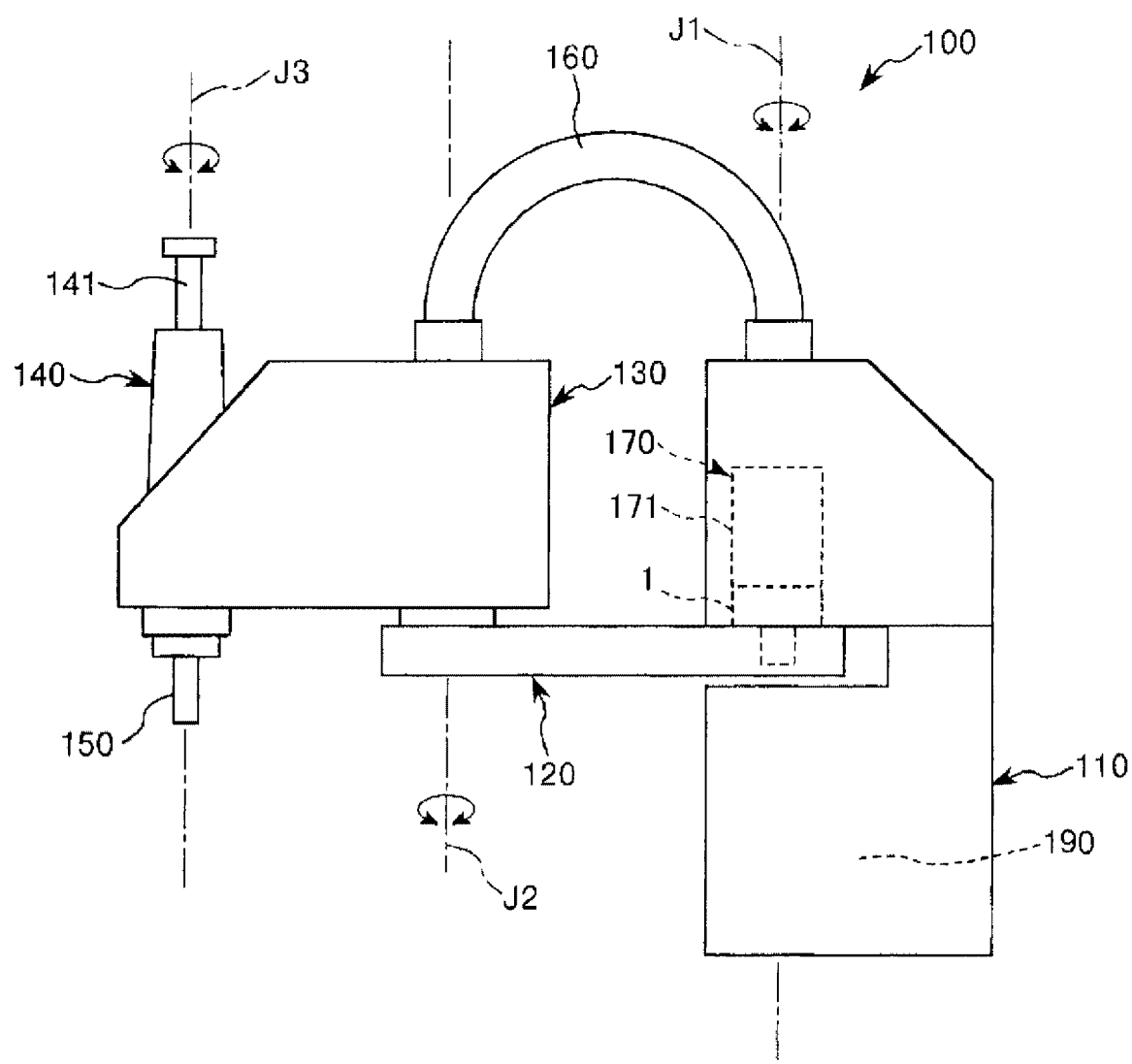
FIG. 1 is a side view showing a schematic configuration of a robot according to an embodiment.

FIG. 1 is a side view showing a schematic configuration of a robot according to an embodiment. In the following explanation, for convenience of explanation, the upper side in FIG. 1 is referred to as "upper" and a lower side in FIG. 1 is referred to as "lower". A base side in FIG. 1 is referred to as "proximal end side" and the opposite side of the base side, that is, an end effector side is referred to as "distal end side". "Direction" in this specification includes both of a direction and the opposite direction of the direction on one side along an axis.

A robot 100 shown in FIG. 1 is a robot used for, for example, work such as supply, removal, conveyance, and assembly of a precision instrument and components configuring the precision instrument. The robot 100 includes, as shown in FIG. 1, a base 110, a first arm 120, a second arm 130, a work head 140, an end effector 150, and a pipe 160. The sections of the robot 100 are briefly explained in order below. "Turn" includes moving in both directions including one direction and the opposite direction of the one direction with respect to a certain center point and rotating with respect to the certain center point.

The base 110 is fixed to, for example, a not-shown floor surface by bolts or the like. A control device 190 that collectively controls the robot 100 is set on the inside of the base 110. The first arm 120 is coupled to the base 110 to be capable of turning, with respect to the base 110, around a first axis J1 extending along the vertical direction. That is, the first arm 120 turns relatively to the base 110.

A first driving section 170 is set in the base 110. The first driving section 170 includes a motor 171 (a driving source), which is a first motor such as a servomotor that generates a driving force for turning the first arm 120, and a gear device 1, which is a first speed reducer that decelerates rotation of the motor 171. An input shaft of the gear device 1 is coupled to a rotating shaft of the motor 171. An output shaft of the gear device 1 is coupled to the first arm 120. Accordingly, when the motor 171 is driven and the driving force of the motor 171 is transmitted to the first arm 120 via the gear device 1, the first arm 120 turns in a horizontal plane around the first axis J1.

The second arm 130 capable of turning around a second axis J2 with respect to the first arm 120 is coupled to the distal end portion of the first arm 120. In the second arm 130, although not shown, a second driving section including a second motor that generates a driving force for turning the second arm 130 and a second speed reducer that decelerates rotation of the second motor is set. The driving force of the second motor is transmitted to the second arm 130 via the second speed reducer, whereby the second arm 130 turns in the horizontal plane around the second axis J2 with respect to the first arm 120.

The work head 140 is disposed at the distal end portion of the second arm 130. The work head 140 includes a spline shaft 141 inserted through a not-shown spline nut and a not-shown ball screw nut coaxially disposed at the distal end portion of the second arm 130. The spline shaft 141 is capable of rotating around a third axis J3 shown in FIG. 1 and is capable of moving in the up-down direction with respect to the second arm 130.

In the second arm 130, although not shown, a rotary motor and an elevation motor are disposed. A driving force of the rotary motor is transmitted to the spline nut by a not-shown driving force transmitting mechanism. When the spline nut regularly and reversely rotates, the spline shaft 141 regularly and reversely rotates around the third axis J3 extending along the vertical direction.

On the other hand, a driving force of the elevation motor is transmitted to the ball screw nut by a not-shown driving force transmitting mechanism. When the ball screw nut regularly and reversely rotates, the spline shaft 141 moves up and down.

The end effector 150 is coupled to the distal end portion of the spline shaft 141. The end effector 150 is not particularly limited. Examples of the end effector 150 include an end effector that grips a conveyed object and an end effector that machines a workpiece.

A plurality of wires connected to electronic components, for example, the second motor, the rotary motor, and the elevation motor disposed in the second arm 130 are drawn around to the inside of the base 110 through the pipe 160 that couples the second arm 130 and the base 110. Further, such a plurality of wires are bound in the base 110 to thereby be drawn around to the control device 190 set in the base 110 together with wires connected to the motor 171 and a not-shown encoder.

As explained above, the robot 100 includes the base 110, which is a first member, the first arm 120, which is a second member provided to be capable of turning with respect to the base 110, the gear device 1 that transmits a driving force from one side to the other side of the base 110 and the first arm 120, and the motor 171, which is a driving source that outputs a driving force to the gear device 1.

The first arm 120 and the second arm 130 may be collectively grasped as "second member". The "second member" may further include the work head 140 and the end effector 150 in addition to the first arm 120 and the second arm 130.

In this embodiment, the first speed reducer is configured by the gear device 1. However, the second speed reducer may be configured by the gear device 1. Both of the first speed reducer and the second speed reducer may be configured by the gear device 1. When the second speed reducer is configured by the gear device 1, the first arm 120 only has to be grasped as the "first member" and the second arm 130 only has to be grasped as the "second member".

Further, in this embodiment, the motor 171 and the gear device 1 are provided in the base 110. However, the motor 171 and the gear device 1 may be provided in the first arm 120. In this case, the output shaft of the gear device 1 only has to be coupled to the base 110.

2. Gear Device 2.1. First Embodiment

A gear device according to a first embodiment is explained.

Figure 2:
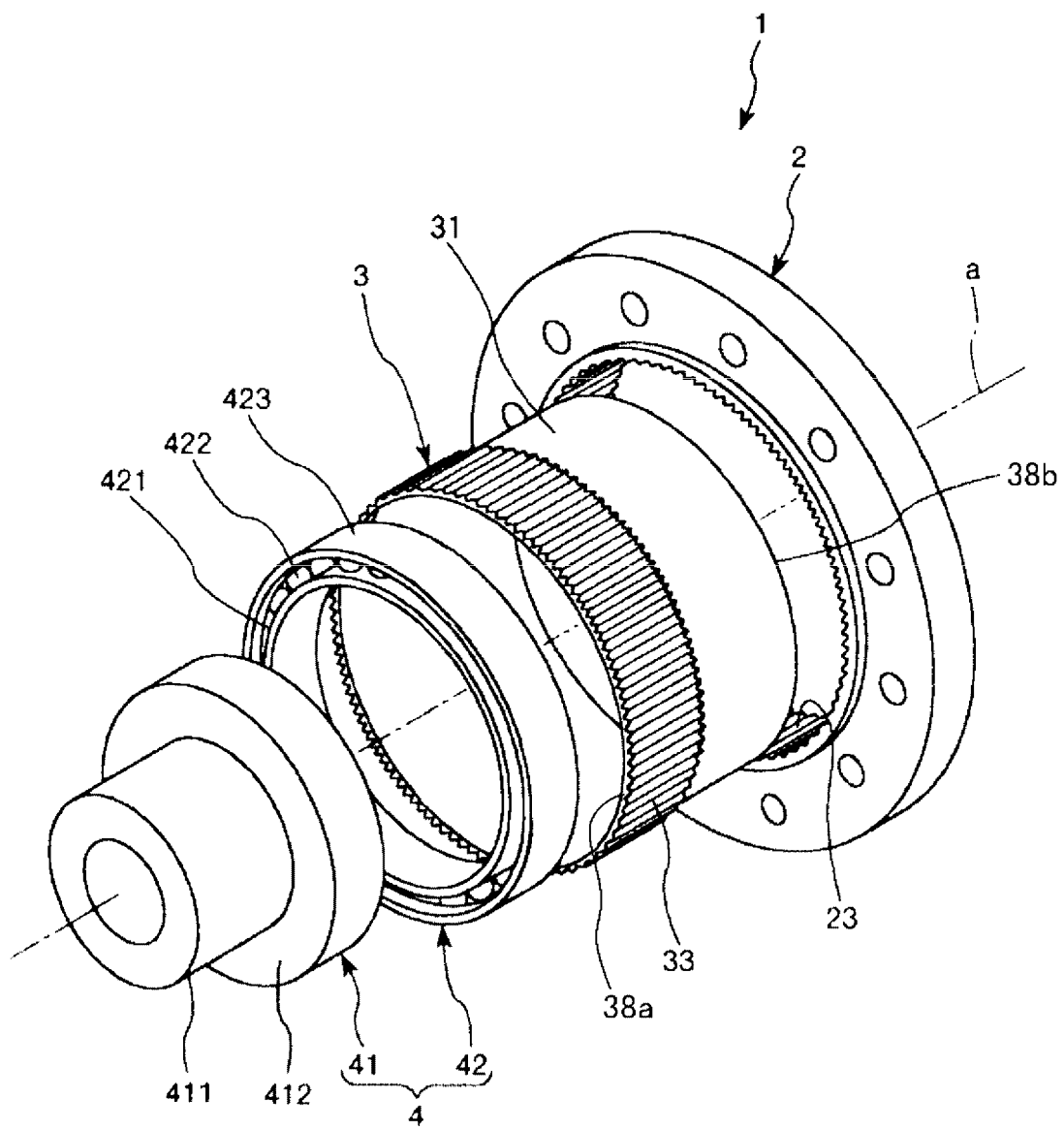
FIG. 2 is an exploded perspective view showing a gear device according to a first embodiment.
Figure 3:
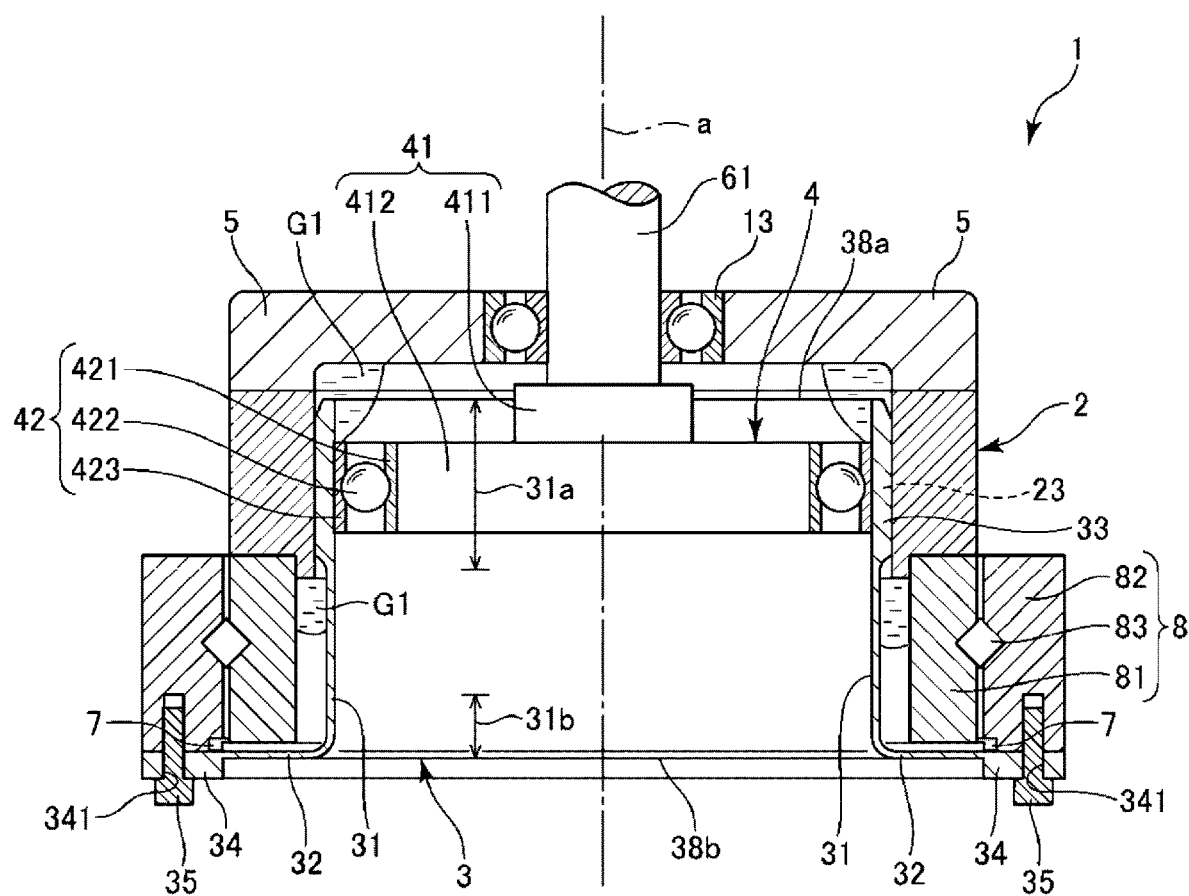
FIG. 3 is a longitudinal sectional view of the gear device shown in FIG. 2.
Figure 4:
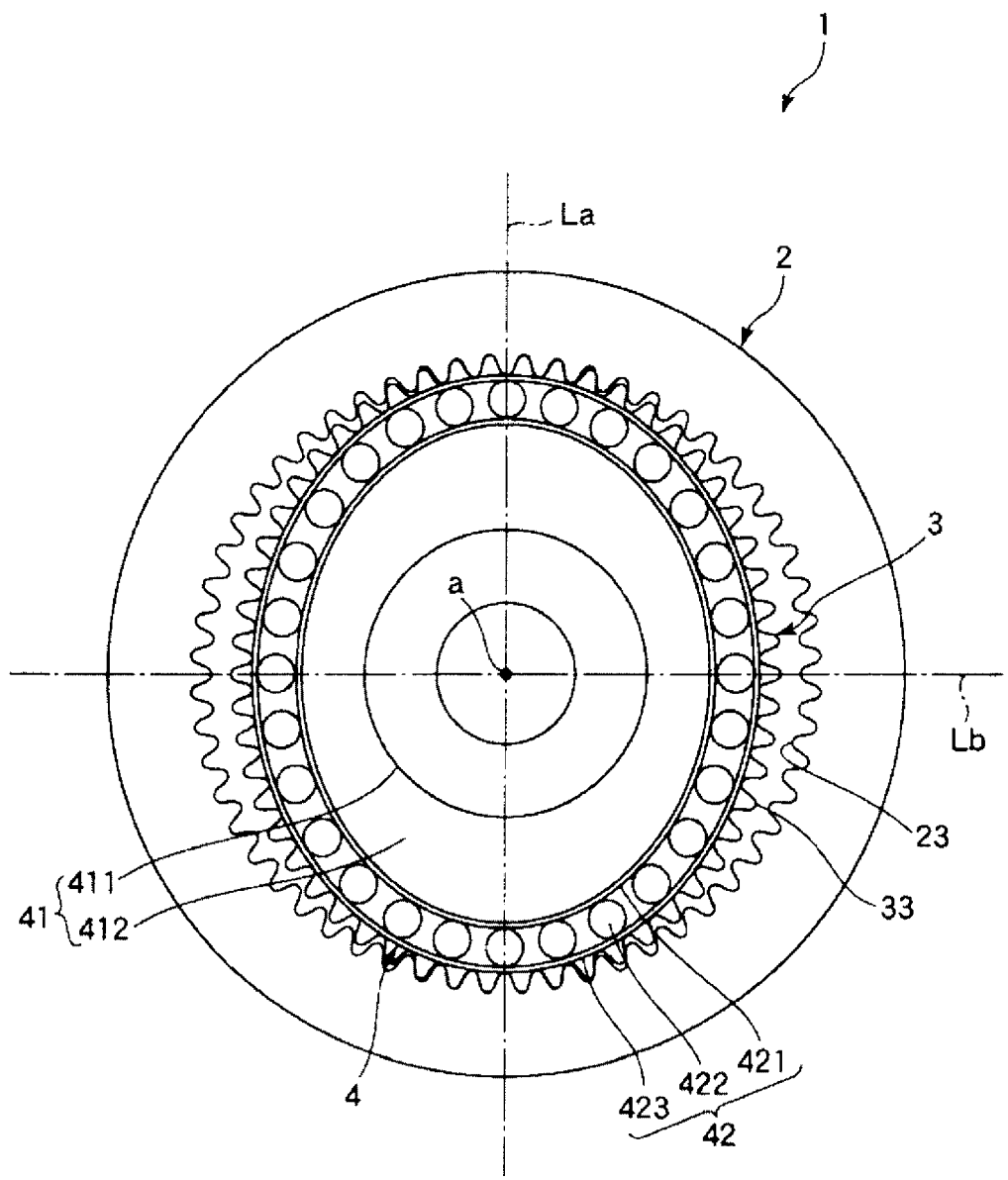
FIG. 4 is a front view of the gear device shown in FIG. 2.

FIG. 2 is an exploded perspective view showing the gear device according to the first embodiment. FIG. 3 is a longitudinal sectional view of the gear device shown in FIG. 2. FIG. 4 is a front view of the gear device shown in FIG. 2. In the figures, for convenience of explanation, dimensions of sections are exaggerated and shown as appropriate according to necessity. Dimension ratios among the sections and actual dimension ratios do not always coincide. In FIG. 2, for convenience of illustration, a diaphragm section 32 and a boss section 34, which are parts of an external gear 3, are omitted.

The gear device 1 shown in FIG. 2 is a wave gear device and is used as, for example, a speed reducer. The gear device 1 includes an internal gear 2, the external gear 3 provided on the inner side of the internal gear 2, and a wave generator 4 provided on the inner side of the external gear 3 and including a bearing 42.

One of the internal gear 2, the external gear 3, and the wave generator 4 is coupled to the base 110 of the robot 100 and another one is coupled to the first arm 120 of the robot 100. In this embodiment, the internal gear 2 is fixed to the base 110, the external gear 3 is coupled to the first arm 120, and the wave generator 4 is coupled to a rotating shaft of the motor 171.

Accordingly, when the rotating shaft of the motor 171 rotates, the wave generator 4 rotates at the same rotating speed as rotating speed of the rotating shaft of the motor 171. The internal gear 2 and the external gear 3 have numbers of teeth different from each other. Therefore, a meshing position of the internal gear 2 and the external gear 3 moves in the circumferential direction. The internal gear 2 and the external gear 3 relatively rotate around a rotation axis "a" because of the difference in the numbers of teeth. In this embodiment, since the number of teeth of the internal gear 2 is larger than the number of teeth of the external gear 3, the external gear 3 can be rotated at rotating speed lower than the rotating speed of the rotating shaft of the motor 171. That is, a speed reducer including the wave generator 4 on the input shaft side and including the external gear 3 on the output shaft side can be realized.

A coupling form of the internal gear 2, the external gear 3, and the wave generator 4 is not limited to the form explained above. For example, when the external gear 3 is fixed to the base 110 and the internal gear 2 is coupled to the first arm 120, the gear device 1 still can be used as the speed reducer. When the external gear 3 is coupled to the rotating shaft of the motor 171, the gear device 1 still can be used as the speed reducer. In this case, the wave generator 4 only has to be fixed to the base 110 and the internal gear 2 only has to be coupled to the first arm 120. When the gear device 1 is used as a speed increaser, that is, when the external gear 3 is rotated at rotating speed higher than the rotating speed of the rotating shaft of the motor 171, the relation between the input side and the output side explained above only has to be reversed.

The configuration of the gear device 1 is briefly explained below. As shown in FIGS. 2 to 4, the internal gear 2 is a gear configured by a rigid body that does not substantially bend in the radial direction and is a ring-like gear having internal teeth 23. In this embodiment, the internal gear 2 is a spur gear. Therefore, the internal teeth 23 have tooth traces parallel to the rotation axis "a". The tooth traces of the internal teeth 23 may be inclined with respect to the rotation axis "a". That is, the internal gear 2 may be a helical gear or a double-helical gear.

The external gear 3 is inserted through the inner side of the internal gear 2. The external gear 3 is a gear having flexibility defectively deformable in the radial direction and is an external gear including external teeth 33 that mesh with the internal teeth 23 of the internal gear 2. The number of teeth of the external gear 3 is smaller than the number of teeth of the internal gear 2. Since the numbers of teeth of the external gear 3 and the internal gear 2 are different from each other in this way, a speed reducer can be realized.

In this embodiment, the external gear 3 is formed in a hat shape, that is, a brimmed cap shape including an opening 38a at the upper end of FIG. 3 and including an opening 38b at the lower end of FIG. 3 and includes the external teeth 33 provided on the outer circumferential surface of the external gear 3. Specifically, the external gear 3 includes a body section 31 formed in a cylindrical shape around the rotation axis "a", the external teeth 33 provided in the body section 31, a ring-like diaphragm section 32 extending toward the outer side from the body section 31, and the boss section 34 coupled to the outer side of the diaphragm section 32.

The body section 31 includes a first end portion 31a, which is a part on the opening 38a side, and a second end portion 31b, which is a part on the opposite side of the first end portion 31a, that is, on the opening 38b side. The wave generator 4 is in contact with the inner circumferential surface of the first end portion 31a. The diaphragm section 32 extends toward the outer side from the second end portion 31b.

A ratio of the length of the body section 31 in the axial direction of the rotation axis "a" and the outer diameter of the body section 31 is not limited to a ratio shown in the figures. For example, the length of the body section 31 may be smaller than the length shown in the figures.

The diaphragm section 32 shown in FIG. 3 extends toward the outer side from the second end portion 31b, that is, toward a direction away from the rotation axis "a". The diaphragm section 32 is formed in an annular shape and is formed in a plate shape.

The boss section 34 shown in FIG. 3 is provided on the opposite side of the body section 31 via the diaphragm section 32, that is, the outer side of the diaphragm section 32. The boss section 34 is also formed in an annular shape. However, the thickness of the boss section 34 is larger than the thickness of the diaphragm section 32. That is, the boss section 34 shown in FIG. 3 is a part, the length of which along the rotation axis "a" is larger than the length of the diaphragm section 32. Further, the boss section 34 shown in FIG. 3 has through-holes 341 piercing through the boss section 34 in the thickness direction. The boss section 34 is fixed to a not-shown output shaft by fixtures such as bolts 35 inserted through the through-holes 341. By providing the boss section 34, it is possible to realize the external gear 3 that can withstand an increase in a load involved in the fixing. A method of coupling the output shaft and the boss section 34 is not limited to this.

As shown in FIGS. 3 and 4, the wave generator 4 is disposed on the inner side of the external gear 3 and is capable of rotating around the rotation axis "a". As shown in FIG. 4, the wave generator 4 deforms the cross section of the external gear 3 into an elliptical shape or an oval shape having a major axis La and a minor axis Lb to thereby mesh the external teeth 33 with the internal teeth 23 of the internal gear 2. The external gear 3 and the internal gear 2 are capable of rotating around the same rotation axis "a" and are meshed with each other on the inside and the outside.

The wave generator 4 is fit in the first end portion 31a of the external gear 3. The wave generator 4 includes a cam 41 and the bearing 42 attached to the outer circumference of the cam 41. The cam 41 includes a shaft section 411 that rotates around the rotation axis "a" and a cam section 412 projecting to the outer side from one end portion of the shaft section 411. When viewed from a direction along the rotation axis "a", the outer circumferential surface of the cam section 412 is formed in an elliptical shape or an oval shape having the major axis La in the up-down direction in FIG. 4. The bearing 42 is fit in the cam 41 and includes an inner ring 421 and an outer ring 423 having flexibility and a plurality of balls 422 disposed between the inner ring 421 and the outer ring 423.

The inner ring 421 is fit in the outer circumferential surface of the cam section 412 of the cam 41 and is elastically deformed in an elliptical shape or an oval shape along the outer circumferential surface of the cam section 412. According to the elastic deformation of the inner ring 421, the outer ring 423 is also elastically deformed in an elliptical shape or an oval shape. As shown in FIG. 3, the outer circumferential surface of the outer ring 423 is in contact with the inner circumferential surface of the body section 31. The plurality of balls 422 are held by a not-shown holder to keep intervals among the plurality of balls 422 in the circumferential direction of the inner ring 421 constant.

Such a wave generator 4 changes the direction of the cam section 412 according to rotation of the cam 41 around the rotation axis "a" and deforms the outer ring 423 according to the change of the direction of the cam section 412. Consequently, the wave generator 4 moves the meshing position of the internal gear 2 and the external gear 3 in the circumferential direction. At this time, since the inner ring 421 is fixedly set on the outer circumferential surface of the cam section 412, a deformed state of the inner ring 421 does not change.

The internal gear 2, the external gear 3, and the wave generator 4 are respectively made of a metal material such as an iron-based material, for example, cast iron, nickel-chrome-molybdenum steel, chrome-molybdenum steel (SCM), maraging steel, or precipitation hardening stainless steel.

In particular, the external gear 3 is preferably made using the nickel-chrome-molybdenum steel as a main material. The nickel-chrome-molybdenum steel is made as tough steel by appropriate heat treatment and is excellent in mechanical characteristics such as fatigue strength. Therefore, the nickel-chrome-molybdenum steel is suitable as a constituent material of the external gear 3 on which stress repeatedly acts.

Examples of the nickel-chrome-molybdenum steel include steel materials of types specified in JIS G 4053:

2016. Specifically, examples of the nickel-chrome-molybdenum steel include steel materials having signs SNCM220, SNCM240, SNCM415, SNCM420, SNCM431, SNCM439, SNCM447, SNCM616, SNCM625, SNCM630, and SNCM815 specified in the JIS standard. Among these steel materials, it is preferable to use SNCM439 as the nickel-chrome-molybdenum steel used as the constituent material of the external gear 3 from the viewpoint that SNCM439 is excellent in mechanical characteristics.

The constituent material of the external gear 3 may include a material other than the nickel-chrome-molybdenum steel. That is, the external gear 3 may be made of a composite material obtained by compounding the nickel-chrome-molybdenum steel and other materials.

On the other hand, the internal gear 2 is preferably made of spherical graphite cast iron. The spherical graphite cast iron prevents the internal teeth 23 of the internal gear 2 from easily adhering because graphite particles contained in the spherical graphite cast iron act as a lubricant. Accordingly, it is possible to reduce wear of the internal gear 2 and extend the life of the internal gear 2.

Examples of the spherical graphite cast iron include materials of types specified in JIS G 5502:2001. Specifically, examples of the spherical graphite cast iron include materials having signs FCD350-22, FCD350-22L, FCD400-18, FCD400-18L, FCD400-15, FCD400-10, FCD450-10, FCD500-7, FCD600-3, FCD700-2, FCD800-2, and FCD900 specified in the JIS standard.

The gear device 1 shown in FIG. 3 includes a case 5. The case 5 supports, for example, a shaft 61 functioning as an input shaft via a bearing 13. The internal gear 2 is coupled to the base 110 shown in FIG. 1 via the case 5. Specifically, the case 5 is fixed to the internal gear 2 by, for example, screwing.

The gear device 1 shown in FIG. 3 includes a cross roller bearing 8. The cross roller bearing 8 includes an inner ring 81, an outer ring 82, and a plurality of rollers 83 disposed between the inner ring 81 and the outer ring 82. The inner ring 81 is provided to be separated from the body section 31 of the external gear 3 and is fixed to the internal gear 2 by, for example, screwing. The outer ring 82 is fixed to the boss section 34 of the external gear 3 by, for example, screwing.

The outer ring 82 is fixed to, for example, a not-shown output shaft. Consequently, the input shaft and the output shaft can be coupled via the gear device 1.

In sections of the gear device 1, specifically, a meshing section of the internal gear 2 and the external gear 3, a fitting section of the external gear 3 and the wave generator 4, and the like, grease G1, which is a lubricant, is disposed as appropriate in advance as shown in FIG. 3.

Figure 5:
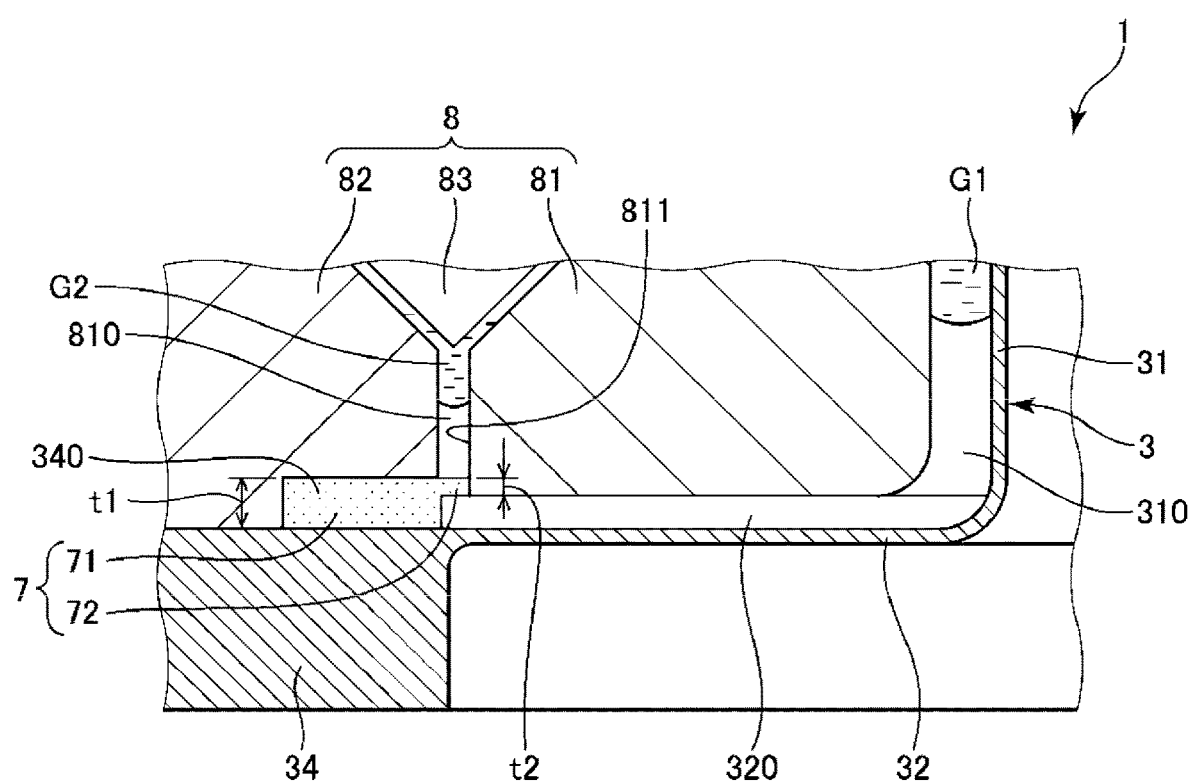
FIG. 5 is a partially enlarged sectional view of the gear device shown in FIG. 3.
Figure 6:
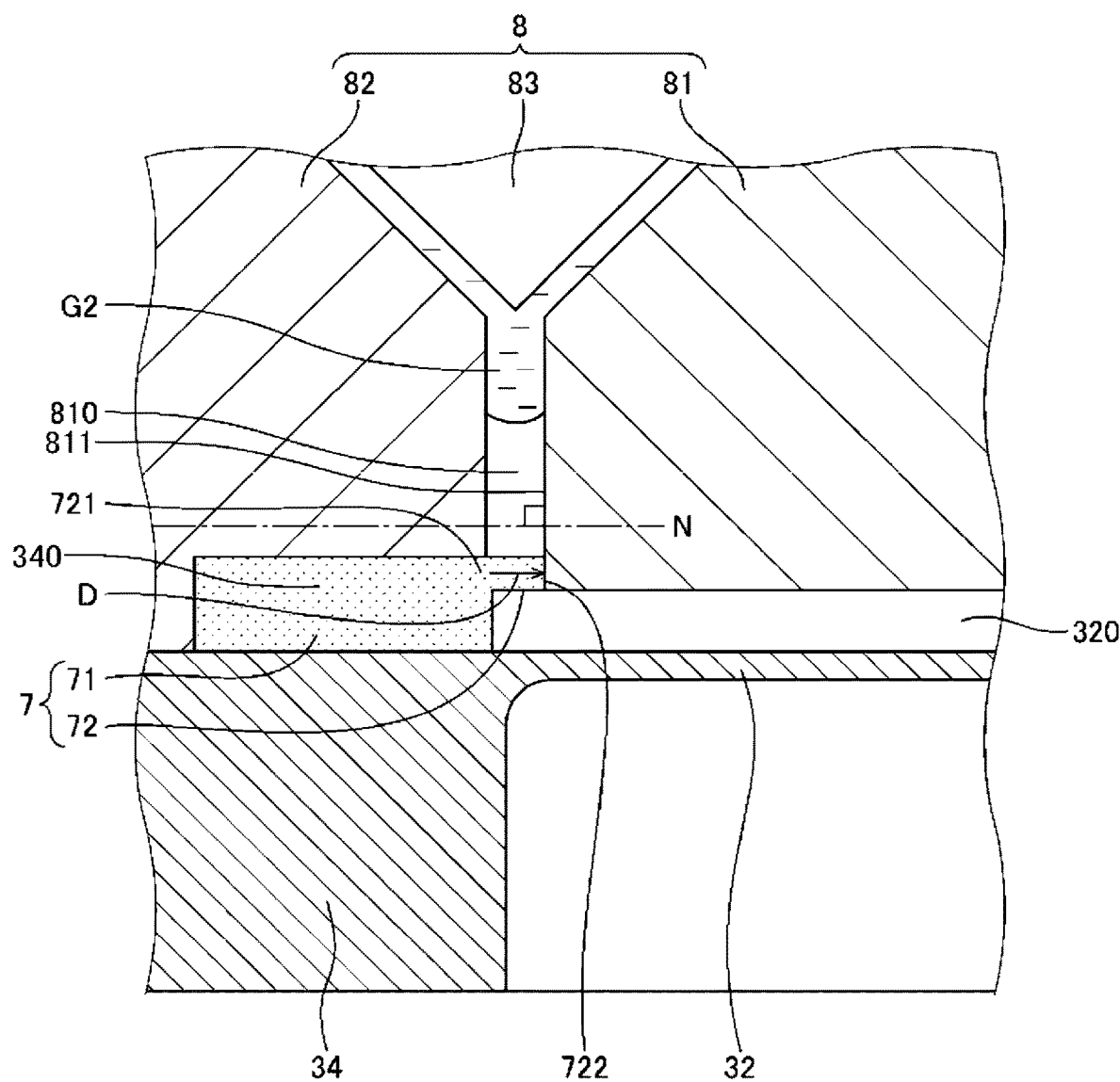
FIG. 6 is a partially enlarged view of FIG. 5.

FIG. 5 is a partially enlarged sectional view of the gear device 1 shown in FIG. 3. FIG. 6 is a partially enlarged view of FIG. 5.

The grease G1 imparts lubricity to a meshing section of the internal teeth 23 and the external teeth 33 shown in FIG. 3. However, a part of the grease G1 flows to regions shown in FIG. 5 according to the operation of the gear device 1. In FIG. 5, a state is shown in which the grease G1 flows to a gap 310 between the body section 31 and the inner ring 81 of the cross roller bearing 8.

The grease G1 is likely to pass through the gap 310 and flow to a gap 320 between the diaphragm section 32 and the inner ring 81 as well. When passing through the gap 320, the grease G1 is likely to further flow to a gap 810 between the inner ring 81 and the outer ring 82 of the cross roller bearing 8 as well.

Grease G2, which is a lubricant, is disposed in advance in the gap 810 between the inner ring 81 and the outer ring 82 of the cross roller bearing 8. The grease G2 imparts lubricity to between the inner ring 81 and the rollers 83 and between the outer ring 82 and the rollers 83.

The grease G2 is likely to flow out from the gap 810 to the gap 320 according to the operation of the gear device 1.

In this way, in the gear device 1, a flow of the grease G1 and the grease G2 is likely to occur. When such a flow of the grease G1 and the grease G2 frequently occurs, it is likely that uneven distribution of the grease G1 and uneven distribution of the grease G2 occur and lubricity becomes insufficient.

Therefore, in this embodiment, a seal section 7 is provided between the external gear 3 and the cross roller bearing 8. The seal section 7 shown in FIG. 5 includes a first seal 71 sandwiched between the boss section 34 of the external gear 3 and the outer ring 82 of the cross roller bearing 8 and a second seal 72 that projects from the first seal 71 and is in contact with an outer circumferential surface 811 of the inner ring 81. In this embodiment, the first seal 71 and the second seal 72 are integrated.

The first seal 71 is formed in an annular shape centering on the rotation axis "a" and sandwiched between the boss section 34 and the outer ring 82 and fixed. Accordingly, the seal section 7 rotates with respect to the inner ring 81 together with the external gear 3 and the outer ring 82.

On the other hand, the second seal 72 is also formed in an annular shape centering on the rotation axis "a". The thickness of the second seal 72 along the rotation axis "a" is smaller than the thickness of the first seal 71. The proximal end of the second seal 72 is coupled to the first seal 71. The distal end of the second seal 72 is in contact with the outer circumferential surface 811 of the inner ring 81. Accordingly, the second seal 72 projects toward the inner ring 81 side from the outer ring 82 side and seals the vicinity of the boundary between the gap 320 and the gap 810 shown in FIG. 5. As a result, it is possible to prevent the grease G1 in the gap 320 and the grease G2 in the gap 810 from flowing to each other. That is, the second seal 72 can prevent both of a flow of the grease G1 from the gap 320 to the gap 810 and a flow of the grease G2 from the gap 810 to the gap 320.

As shown in FIG. 6, a proximal end 721 of the second seal 72 is fixed to the outer ring 82 side via the first seal 71 and a distal end 722 of the second seal 72 is set in contact with the outer circumferential surface 811 of the inner ring 81 to secure sealability. With such a form, it is possible to reduce a contact area between the second seal 72 and the outer circumferential surface 811 of the inner ring 81. Accordingly, it is possible to reduce a frictional force applied to the inner ring 81 by the second seal 72. Torque transmission efficiency of the gear device 1 less easily decreases even if the seal section 7 comes into contact with the gear device 1. A wear amount of the second seal 72 worn by the outer circumferential surface 811 is small. This contributes to extension of the life of the seal section 7.

A sectional shape of the second seal 72 taken along a plane including the rotation axis "a" is not particularly limited. However, as shown in FIG. 5, the sectional shape is preferably a shape having a major axis in the radial direction of the external gear 3. With such a shape, it is possible to particularly reduce a contact area between the second seal 72 and the inner ring 81 while sealing the boundary between the gap 320 and the gap 810.

The second seal 72 preferably has flexibility. In particular, the second seal 72 more preferably has elasticity having a characteristic of returning to an original shape in addition to the flexibility. Since the second seal 72 has these characteristics, the second seal 72 can achieve both of reducing a frictional force generated between the second seal 72 and the inner ring 81 and securing sealability between the gap 320 and the gap 810.

As explained above, the first seal 71 is sandwiched between the boss section 34 and the outer ring 82. Consequently, the first seal 71 seals a gap 340 between the boss section 34 and the outer ring 82. Consequently, it is possible to prevent the grease G1 and the grease G2 from flowing out to the outside via the gap 340.

The boss section 34 and the outer ring 82 are fixed to each other by the bolts 35. The first seal 71 can be compressed in the up-down direction in FIG. 5 by fastening the bolts 35. Consequently, it is possible to further improve the sealability by the first seal 71.

Examples of a constituent material of the first seal 71 and a constituent material of the second seal 72 respectively include various elastomers such as a thermoplastic elastomer material and a rubber material. Examples of the thermoplastic elastomer material include polystyrene-based thermoplastic elastomer, polyolefin-based thermoplastic elastomer, polyvinyl chloride-based thermoplastic elastomer, polyurethane-based thermoplastic elastomer, polyester-based thermoplastic elastomer, polyamide-based thermoplastic elastomer, and polybutadiene-based thermoplastic elastomer. Examples of the rubber material include silicone rubber, chloroprene rubber, nitrile butadiene rubber, ethylene propylene rubber, fluorocarbon rubber, natural rubber, isoprene rubber, styrene butadiene rubber, butyl rubber, and butadiene rubber.

The constituent material of the first seal 71 and the constituent material of the second seal 72 may be the same or may be different from each other. Any additive may be added to the materials according to necessity. Examples of the additive include an additive for improving wear resistance, an additive for improving lubricity, and an additive for improving mechanical strength.

Thickness t1 along the rotation axis "a" of the first seal 71 shown in FIG. 5 is not particularly limited but is preferably approximately 0.3 mm or more and 5.0 mm or less.

Thickness t2 along the rotation axis "a" of the second seal 72 is not particularly limited but is preferably approximately 0.1 mm or more and 3.0 mm or less and more preferably approximately 0.2 mm or more and 2.0 mm or less. Consequently, it is possible to achieve both of sufficient mechanical strength for improving sealability and a reduction of a contact area with the inner ring 81.

As explained above, the gear device 1 according to this embodiment includes the internal gear 2, the external gear 3, the wave generator 4, the cross roller bearing 8, the first seal 71, and the second seal 72. The external gear 3 has flexibility and partially meshes with the internal gear 2 and rotates around the rotation axis "a" relatively to the internal gear 2. The external gear 3 includes the body section 31, the external teeth 33, the diaphragm section 32, and the boss section 34. The body section 31 is formed in a cylindrical shape and includes the first end portion 31a with which the wave generator 4 is in contact and the second end portion 31b on the opposite side of the first end portion 31a. The external teeth 33 are provided on the outer circumferential surface of the first end portion 31a. The diaphragm section 32 is formed in an annular shape and provided on the outer side of the second end portion 31b. The boss section 34 is provided on the outer side of the diaphragm section 32. The cross roller bearing 8 includes the outer ring 82 and the inner ring 81.

The first seal 71 and the second seal 72 are respectively fixed to the outer ring 82. Further, the first seal 71 is sandwiched between the boss section 34 and the outer ring 82. The second seal 72 includes the proximal end 721 and the distal end 722. The proximal end 721 is fixed to the outer ring 82. The distal end 722 is in contact with the outer circumferential surface 811 of the inner ring 81.

With such a configuration, the first seal 71 seals the gap 340 between the boss section 34 and the outer ring 82. The second seal 72 seals the boundary between the gap 320 and the gap 810. Consequently, it is possible to improve sealability around the cross roller bearing 8. It is possible to prevent the grease G1 and the grease G2 from being unevenly distributed in the gear device 1. As a result, it is possible to achieve extension of the life of the gear device 1.

By preventing flows in both direction of the grease between the gap 320 and the gap 810, for example, when components of the grease G1 and the grease G2 are differentiated, it is possible to prevent both the components from changing. When foreign matters are mixed in the grease G1 or foreign matters are mixed in the grease G2, it is also possible to prevent the foreign matters from spreading to a wide range.

In the seal section 7 according to this embodiment, the first seal 71 and the second seal 72 are integrated. With such a configuration, workability in assembling the seal section 7 to the gear device 1 is improved. Since an external force applied to the relatively thin second seal 72 can be allowed to escape to the first seal 71 side, it is also possible to achieve extension of the life of the seal section 7 itself.

In FIG. 6, a direction in which the distal end 722 of the second seal 72 comes into contact with the outer circumferential surface 811 of the inner ring 81 (a contact direction D) is indicated by an arrow. The contact direction D is a direction connecting the proximal end 721 and the distal end 722 of the second seal 72 when the seal section 7 is in contact with the outer circumferential surface 811. The contact direction D is preferably a direction forming an angle of ±45° or less with respect to a normal N of the outer circumferential surface 811 of the inner ring 81. In FIG. 6, as an example, since the contact direction D and the normal N are parallel, an angle formed by the contact direction D and the normal N is 0°.

With such a configuration, the effect of preventing both of the grease G1 and the grease G2 from flowing out explained above becomes more conspicuous. That is, by setting the contact direction D as explained above, it is possible to prevent the second seal 72 from being opened by the flow of one of the grease G1 and the grease G2. When the contact direction D and the major axis of the second seal 72 are parallel as in this embodiment, the second seal 72 is compressed in the contact direction D by the contact of the distal end 722. Therefore, it is possible to improve the rigidity of the second seal 72. Consequently, the second seal 72 much less easily opens.

The robot 100 includes the base 110, which is the first member, the first arm 120, which is the second member that turns with respect to the base 110, the gear device 1 that transmits a driving force for turning the first arm 120 relatively to the base 110, and the motor 171, which is the driving source that outputs the driving force to the gear device 1.

With such a configuration, since extension of the life of the gear device 1 is achieved, it is possible to realize the robot 100 for which labor and time for maintenance are reduced.

2.2 Second Embodiment

A gear device according to a second embodiment is explained.

Figure 7:
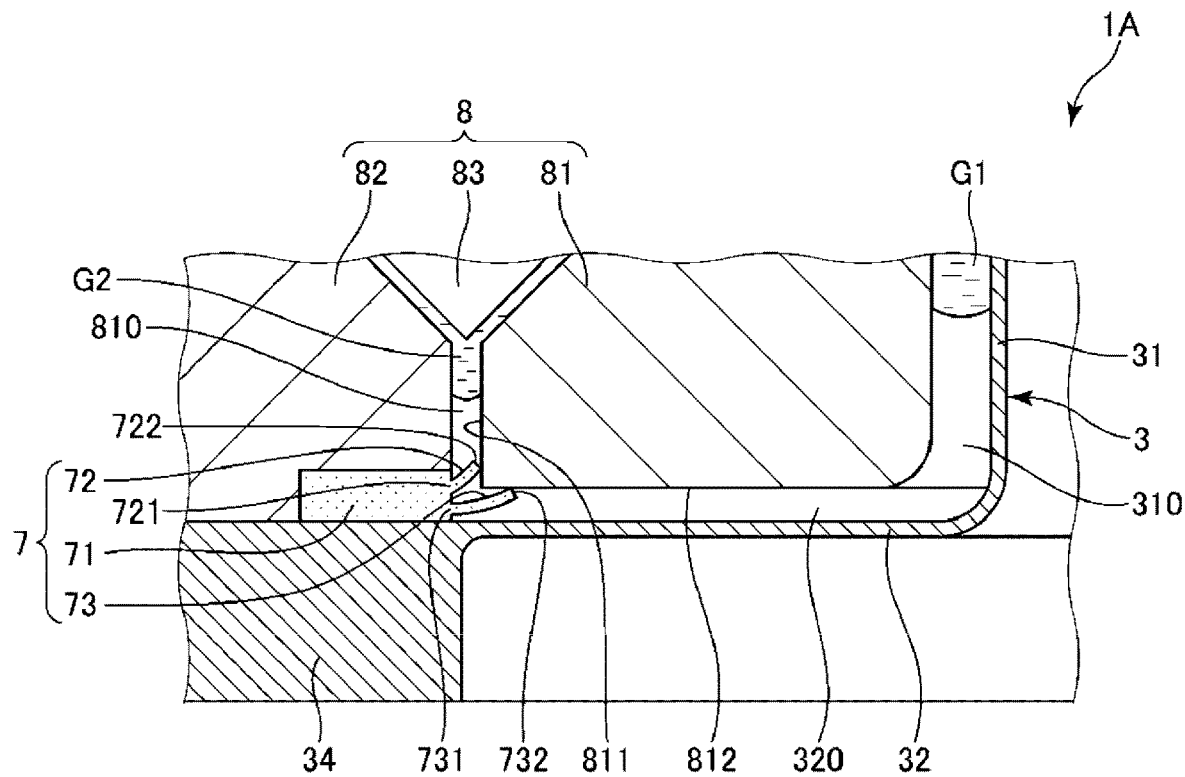
FIG. 7 is a partially enlarged sectional view showing a gear device according to a second embodiment.

FIG. 7 is a partially enlarged sectional view showing the gear device according to the second embodiment.

The second embodiment is explained below. In the following explanation, differences from the first embodiment are mainly explained and explanation about similarities to the first embodiment is omitted.

A gear device 1A shown in FIG. 7 is the same as the gear device 1 shown in FIG. 5 except that the configuration of the seal section 7 is different.

The seal section 7 shown in FIG. 7 includes a third seal 73 in addition to the first seal 71 and the second seal 72. The third seal 73 projects from the first seal 71 and is in contact with a bottom surface 812 of the inner ring 81. Specifically, a proximal end 731 of the third seal 73 is fixed to the first seal 71. A distal end 732 of the third seal 73 is in contact with the bottom surface 812 of the inner ring 81. By providing such a third seal 73, it is possible to more surely seal the boundary between the gap 320 and the gap 810 in conjunction with the second seal 72.

The third seal 73 is in contact with the bottom surface 812 of the inner ring 81. Accordingly, the third seal 73 is structured to less easily open when the grease G1 is about to flow out from the gap 320 to the gap 810.

On the other hand, in the second seal 72 according to this embodiment, the proximal end 721 is fixed to the first seal 71 and the distal end 722 is in contact with the outer circumferential surface 811 of the inner ring 81. Accordingly, the second seal 72 is structured to particularly less easily open when the grease G2 is about to flow out from the gap 810 to the gap 320.

Therefore, the seal section 7 according to this embodiment includes both of the second seal 72 that is in contact with the outer circumferential surface 811 of the inner ring 81 and the third seal 73 that is in contact with the bottom surface 812. Accordingly, it is possible to more surely prevent the grease G1 and the grease G2 from flowing to each other.

In this embodiment, the second seal 72 is held such that the proximal end 721 of the second seal 72 is located further on the diaphragm section 32 side than the distal end 722. That is, in the second seal 72 shown in FIG. 7, the distal end 722 penetrates deeper into the gap 810 side than the proximal end 721. Such a second seal 72 particularly less easily opens when the grease G2 is about to flow out from the gap 810 to the gap 320.

As explained above, the seal section 7 according to this embodiment includes the third seal 73 including the proximal end 731 and the distal end 732. The proximal end 731 of the third seal 73 is fixed to the outer ring 82 of the cross roller bearing 8. The distal end 732 of the third seal 73 is in contact with the bottom surface 812 of the inner ring 81, that is, a surface opposed to the diaphragm section 32.

As explained above, the third seal 73 particularly less easily opens when the grease G1 is about to flow out from the gap 320 to the gap 810. Accordingly, since the third seal 73 is added, it is possible to more surely seal the boundary between the gap 320 and the gap 810 in conjunction with the second seal 72.

In the embodiment explained above, the same effects as the effects in the first embodiment can be obtained.

2.3. Third Embodiment

A gear device according to a third embodiment is explained.

Figure 8:
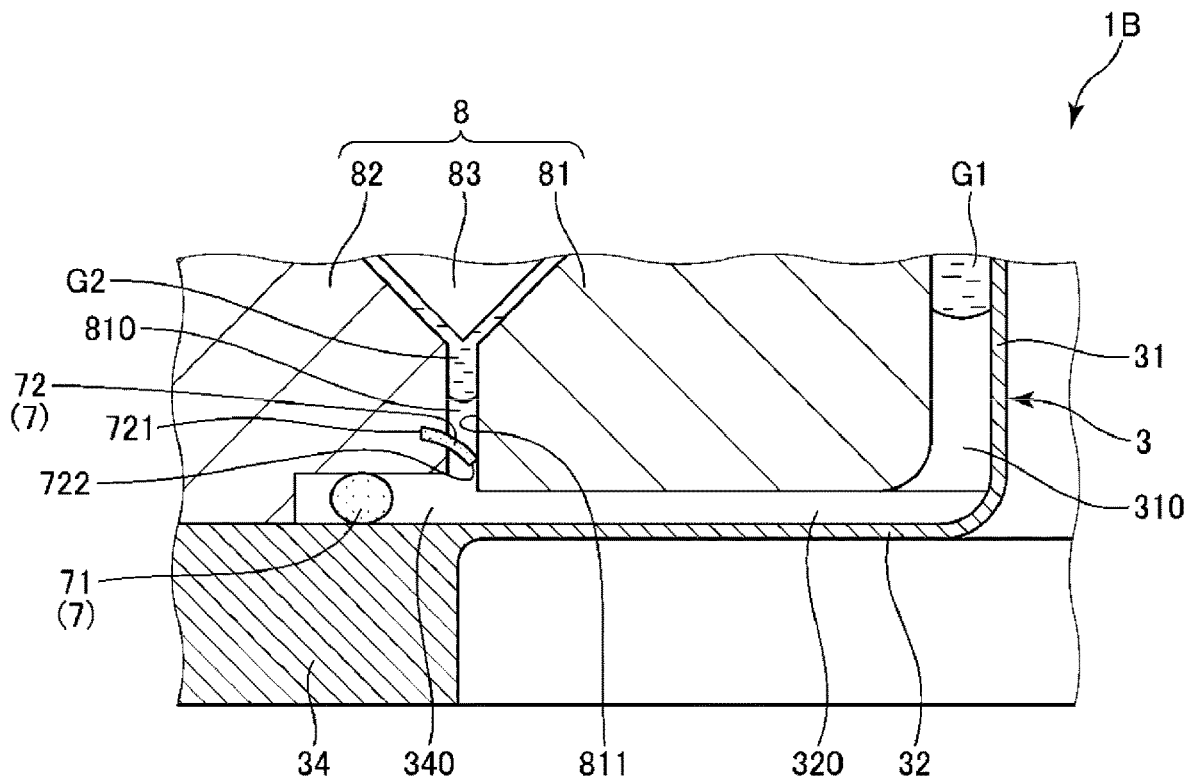
FIG. 8 is a partially enlarged sectional view showing a gear device according to a third embodiment.

FIG. 8 is a partially enlarged sectional view showing the gear device according to the third embodiment.

The third embodiment is explained below. In the following explanation, differences from the first embodiment are mainly explained. Explanation about similarities to the first embodiment is omitted.

A gear device 1B shown in FIG. 8 is the same as the gear device 1 shown in FIG. 5 except that the configuration of the seal section 7 is different.

In the seal section 7 shown in FIG. 8, the first seal 71 and the second seal 72 are separated.

The first seal 71 shown in FIG. 8 is formed in a ring shape, a lateral sectional shape of which is circular. That is, the first seal 71 is a so-called O-shaped ring. The first seal 71 is sandwiched in the gap 340 between the boss section 34 and the outer ring 82 and compressed in the up-down direction in FIG. 8. Consequently, it is possible to prevent the grease G1 and the grease G2 from flowing out to the outside via the gap 340.

In the second seal 72 shown in FIG. 8, the proximal end 721 is directly fixed to the outer ring 82 of the cross roller bearing 8 and the distal end 722 is in contact with the outer circumferential surface 811 of the inner ring 81. In this case as well, the contact direction of the second seal 72 is preferably a direction forming an angle of ±45° or less with respect to the normal of the outer circumferential surface 811.

As shown in FIG. 8, the second seal 72 may be held in a posture in which the distal end 722 is located further on the diaphragm section 32 side than the proximal end 721. In this posture, in particular, it is possible to prevent a flow of the grease G1 from the gap 320 to the gap 810. This is useful from the viewpoint of effectively preventing an outflow of both of the grease G1 and the grease G2 even when a flow of the grease G1 is predominant over a flow of the grease G2 because of an operation state of the gear device 1.

In this embodiment, the first seal 71 and the second seal 72 are separated. In the seal section 7 having such a configuration, it is possible to combine the first seal 71 and the second seal 72 having a general shape to configure the seal section 7. Accordingly, it is possible to achieve a reduction in cost of the seal section 7.

Further, a constituent material of the first seal 71 and a constituent material of the second seal 72 can be differentiated. Consequently, it is possible to properly use materials as the constituent material of the first seal 71 and the constituent material of the second seal 72, for example, use a material excellent in resilience as the constituent material of the first seal 71 and use a material excellent in wear resistance as the constituent material of the second seal 72. As a result, it is possible to achieve improvement of a function of the seal section 7.

In the third embodiment explained above, the same effects as the effects in the first embodiment can be obtained.

The gear device and the robot of the present disclosure are explained above based on the illustrated embodiments. However, the present disclosure is not limited to the embodiments. The components of the sections in the embodiments can be replaced with any components having the same functions. Any other components may be added to the embodiments.

In the embodiments explained above, the gear device in which the base included in the robot is the "first member" and the first arm included in the robot is the "second member" and a driving force is transmitted from the first member to the second member is explained. However, the present disclosure is not limited to this. The present disclosure is also applicable to a gear device in which an n-th arm is the "first member" and a (n+1)-th arm is the "second member" and a driving force is transmitted from one to the other of the n-th arm and the (n+1)-th arm. Note that n is an integer equal to or larger than 1. The present disclosure is also applicable to a gear device in which a driving force is transmitted from the second member to the first member.

In the embodiments explained above, a horizontal articulated robot is explained. However, the robot of the present disclosure is not limited to this. For example, the number of joints of the robot is optional. The present disclosure is also applicable to a vertical articulated robot.

Further, in the embodiments explained above, an example is explained in which the gear device is incorporated in the robot. However, the gear device of the present disclosure can also be incorporated and used in various apparatuses having a configuration in which a driving force is transmitted from a first member to a second member that turn with respect to each other.

What is claimed is:

1. A gear device comprising:
    an internal gear;
    an external gear having flexibility and configured to partially mesh with the internal gear and rotate around a rotation axis relatively to the internal gear;
    a wave generator configured to come into contact with an inner circumferential surface of the external gear and move a meshing position of the internal gear and the external gear in a circumferential direction around the rotation axis;
    a cross roller bearing including an outer ring and an inner ring; and
    a first seal and a second seal fixed to the outer ring, wherein
    the external gear includes:
        a cylindrical body section including a first end portion, with which the wave generator is in contact, and a second end portion on an opposite side of the first end portion;
        external teeth provided on an outer circumferential surface of the first end portion;
        an annular diaphragm section provided on an outer side of the second end portion; and
        a boss section provided on an outer side of the diaphragm section,
    the first seal is sandwiched between the boss section and the outer ring, and
    the second seal includes a proximal end and a distal end, the proximal end is fixed to the outer ring,
    wherein a gap is formed between an inner circumferential surface of the outer ring and an outer circumferential surface of the inner ring,
    wherein the second seal is held to locate the distal end of the second seal so that the distal end penetrates into the gap and is in contact with the outer circumferential surface of the inner ring.

2. The gear device according to claim 1, wherein the first seal and the second seal are integrated.

3. The gear device according to claim 1, wherein the first seal and the second seal are separated.

4. The gear device according to claim 1, wherein a contact direction of the distal end of the second seal with the outer circumferential surface is a direction forming an angle within the range of −45° to +45° with respect to a normal of the outer circumferential surface.

5. The gear device according to claim 1, further comprising a third seal including a proximal end and a distal end, wherein
    the proximal end of the third seal is fixed to the outer ring, and
    the distal end of the third seal is in contact with a surface of the inner ring opposed to the diaphragm section.

6. A robot comprising:
    a first member;
    a second member configured to turn with respect to the first member;
    the gear device according to claim 1 configured to transmit a driving force for turning the second member relatively to the first member; and
    a driving source configured to output the driving force toward the gear device.

* * * * *